March 24, 1970 R. W. ASTHEIMER 3,502,874
INFRARED THERMOGRAPH

Filed May 3, 1967 3 Sheets-Sheet 1

INVENTOR.
ROBERT W. ASTHEIMER
BY Joseph Levinson
ATTORNEY

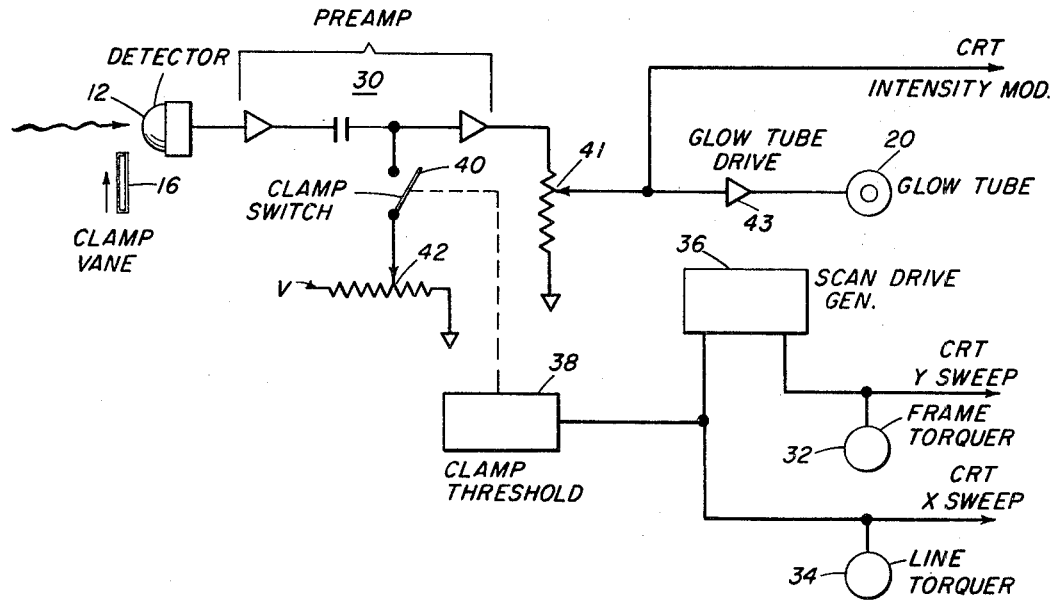
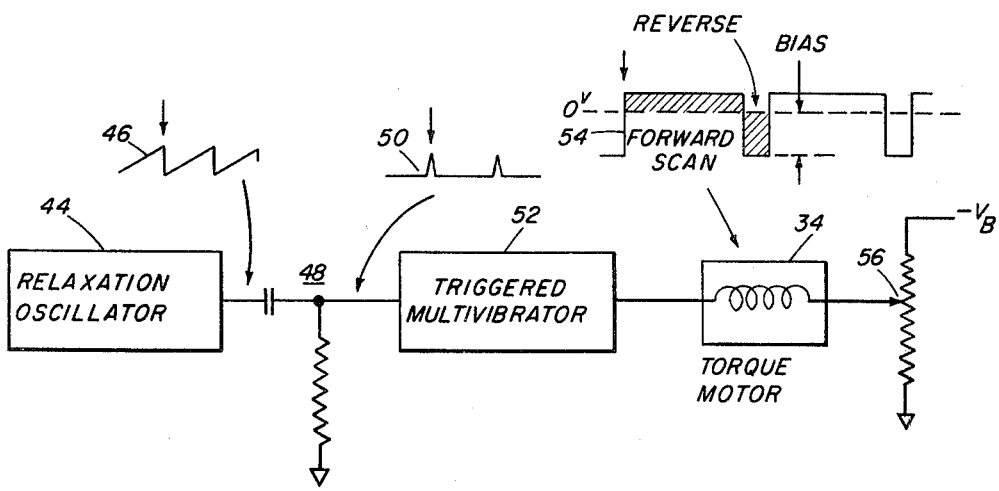

March 24, 1970  R. W. ASTHEIMER  3,502,874
INFRARED THERMOGRAPH

Filed May 3, 1967  3 Sheets-Sheet 3

INVENTOR.
ROBERT W. ASTHEIMER
BY Joseph Levinson
ATTORNEY

United States Patent Office 3,502,874
Patented Mar. 24, 1970

3,502,874
INFRARED THERMOGRAPH
Robert W. Astheimer, Westport, Conn., assignor to Barnes Engineering Company, Stamford, Conn., a corporation of Delaware
Filed May 3, 1967, Ser. No. 635,865
Int. Cl. G01t 1/16
U.S. Cl. 250—83.3     11 Claims

ABSTRACT OF THE DISCLOSURE

A thermograph is provided utilizing a converging objective lens and a plane folding mirror which reflects back incoming energy from the field of view toward the rear face of the objective lens, which has positioned thereat an infrared detector at the focal point of the reflected beam. The folded mirror is mounted on a double-gimballed suspension which provides vertical and horizontal scanning motions from torquer motors which drive the gimbal. An ambient temperature reference is provided by a blackened vane which moves into the field of view of the detector after each scan line and the output of the detector is clamped to the reference level. The readout from the detector may be applied directly to an oscilloscope, or in photographic form.

BACKGROUND OF THE INVENTION

This invention relates to an infrared thermograph for converting an infrared image from the field of view of the thermograph into a visual presentation of the field of view.

The invention of the present application is directed to the type of thermograph disclosed in Patent No. 2,895,049, issued July 14, 1959, to R. W. Astheimer et al., who is the inventor of the present application. The thermograph of the aforesaid patent provides excellent resolution and sensitivity, and has proved quite successful. Among its disadvantages, however, for certain types of application, are expense and speed. The present invention is directed to these latter considerations.

SUMMARY OF THE INVENTION

In carrying out this invention in one illustrative embodiment thereof, an optical means, including a scanning mirror, is used for applying infrared radiation from a field of view to an infrared detector. The scanning mirror is driven over the field of view to form a raster-type scan pattern of successive lines in the field of view of the detector. An amplifier is coupled to the detector and clamped to a reference level on each successive line scanned in the scan pattern. In a preferred form the scanning mirror is mounted in a double-gimbal suspension which is driven by torque motors to provide vertical and horizontal scanning motions. Also in the preferred form clamping is achieved by providing a blackened vane which is attached to the scanning mirror and oriented so that it passes in front of the detector just prior to each scan line.

BRIEF DESCRIPTION OF THE DRAWINGS

FIG. 2 is a schematic diagram, partly in block form, of the electrical system of the thermograph, FIG. 3 is a schematic diagram illustrating parts of the scan drive system for the thermograph.

DESCRIPTION OF THE PREFERRED EMBODIMENT

Figure 1:
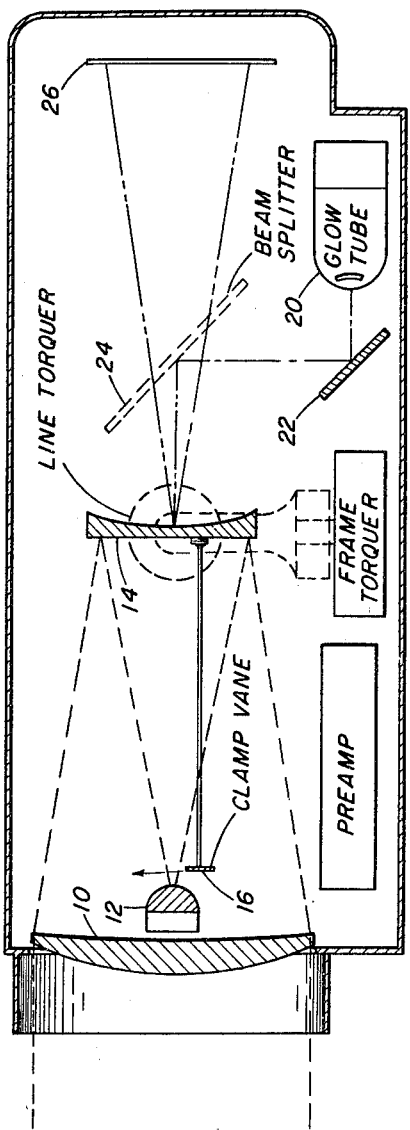
FIG. 1 is a schematic diagram of a side view of the thermograph of this invention illustrating the optical layout and general arrangement of components.

Referring now to FIG. 1, there is shown the optical layout in schematic form, which is simple and compact. A converging objective lens 10 focuses energy on an immersed thermistor detector 12 after being reflected from a plane scanning mirror 14. The immersed detector 12 obscures a portion of the incident energy due to its position behind the objective lens. However, the resulting optical system exhibits good off-axis performance because the field curvature of the simple lens 10 is offset by the opposite curvature introduced by the rotating effect of the scanning mirror 14. As will be explained more hereinafter with reference to FIG. 4, the scanning mirror 14 is mounted in a double-gimbal suspension for providing vertical and horizontal scanning motions in order that the field of view may be scanned. This simple optical system lends itself to a more rapid scanning speed. For example, in a preferred embodiment, a 3″ diameter objective lens with an immersed detector mounted behind the lens as shown in FIG. 1 and utilizing a 2″ diameter scanning mirror located about half the focal length from the lens 10 provides a frame of a field of view 10° x 10° with an angular resolution of 10,000 elements at 0.1° x 0.1°.

Another important feature which leads to simplification in the electronics of the thermograph is the clamp vane 16 shown on FIG. 1, which will be described more subsequently. The function of the vane 16 is to provide an ambient temperature reference, and all output signals from the detector 12 will be relative to this reference. The thin blackened vane 16, as shown in FIG. 1 in the preferred embodiment, moves into the field of view after each scan line, at which the output of the detector is clamped to a reference level.

The simple configuration shown in FIG. 1 lends itself quite well for direct photographic recording, which is similar to that employed in the aforesaid patent. The output of the detector 12 can be used to intensity-modulate a glow tube 20 whose light is reflected from a mirror 22 and a beam splitter 24 to the back of the scanning mirror 14, which is also a mirrored surface having a concave configuration. As scanning mirror 14 sweeps over the field of view of the detector, the output of the glow tube 20 in like fashion is synchronously swept over a photographic film 26, to provide a visual image of the radiation received by the detector from its field of view.

Referring now to the block diagram of the electronic system in FIG. 2, radiation applied to the detector 12 is amplified in a preamplifier 30. A radiation reference level is provided by the light-weight blackened vane 16 which is attached to the folded scanning mirror 14 and oriented so that is passes in front of the detector just prior to each scan line. The scanning mirror 14 is driven by a frame torquer 32 and a line torquer 34 which are driven by a scan-drive generator 36. Since the vane 16 is automatically moved in front of the detector 12 after each scan line, which always occurs when the torquer drive voltage from the scan generator 36 drives the line torquer 34 and accordingly the mirror 14 to one extreme, this same voltage is used to trigger a clamp threshold circuit 38 which actuates clamp switch 40 to clamp the preamplifier 30 to an adjustable reference voltage potentiometer 42 which is connected between the source of potential and ground. The clamp threshold circuit may be in the form of a transistor or field effects transistor trigger circuit. This circuitry establishes a black level or ambient temperature reference to which all the output signals of the detector relates.

The output of the preamplifier 30 is applied to a gain control potentiometer 41 which sets the dynamic range of the display to match the desired radiance level of the target to a desired form of display. As shown in FIG. 2, the output from the gain control potentiometer 41 may be applied to a cathode ray tube (CRT) which would intensity-modulate it and the torquer voltages from the scan drive generator 36 would be applied to the cathode ray tube to provide the X–Y sweeps thereof. In another alternative, direct photographic recording may be provided by applying the output from the gain control 41 to a glow tube drive 43 for modulating the glow tube 20. The present system is convenient for photographic recording in view of the accessibility of the back side of the mirror 14, which would scan the intensity-modulated glow tube 20 over the photographic film 26 (as seen in FIG. 1), which is in synchronism with the front surface of the mirror 14 which is simultaneously scanning the field of view.

The scan drive generator 36 is required to produce drive voltages which provide a linear forward scan and a quick return. One form of drive which may be utilized for the line torquer is illustrated in FIG. 3. A relaxation oscillator 44 provides a sawtooth waveform 46 which is supplied to a differentiating circuit 48. The differentiated output, as shown by waveform 50, is applied from the differentiation circuit 48 to a triggered multivibrator 52, producing a wave form 54 which is applied to the line torquer motor 34. A bias potentiometer 56 is connected to the torquer 34 between a source of voltage and ground. The waveform 54 provides for a forward linear scan during the portion exceeding the zero volt level of the waveform and for a quick return on the area below the zero volt level of the waveform. The drive for the frame torquer may be in the form of a simple D.C. voltage which is applied when the scan generator is turned on. All that is required here is a low speed drive of one cycle in approximately 30 seconds, which may be accomplished, for example, using a type TQ18 torquer which would rotate the entire scanning assembly.

Scanning motions of the mirror 14 are provided by mounting the mirror in a double-gimbal suspension which is driven by D.C. torquer motors acting against pneumatic dashpots. In this system, when a voltage is applied to the torquer, a proportional torque is developed which moves the mirror against the damping action of the dashpot. The damping constant of the dashpot can be controlled by a screw adjustment on the orifice of the dashpot. If the damper is moved at a uniform velocity, a constant resistive force is developed. Therefore when a constant voltage is applied to the torquer for a given time, this causes the mirror to scan at a uniform velocity during this time. Then, when the voltage is reversed, the mirror is driven back.

Figure 4:
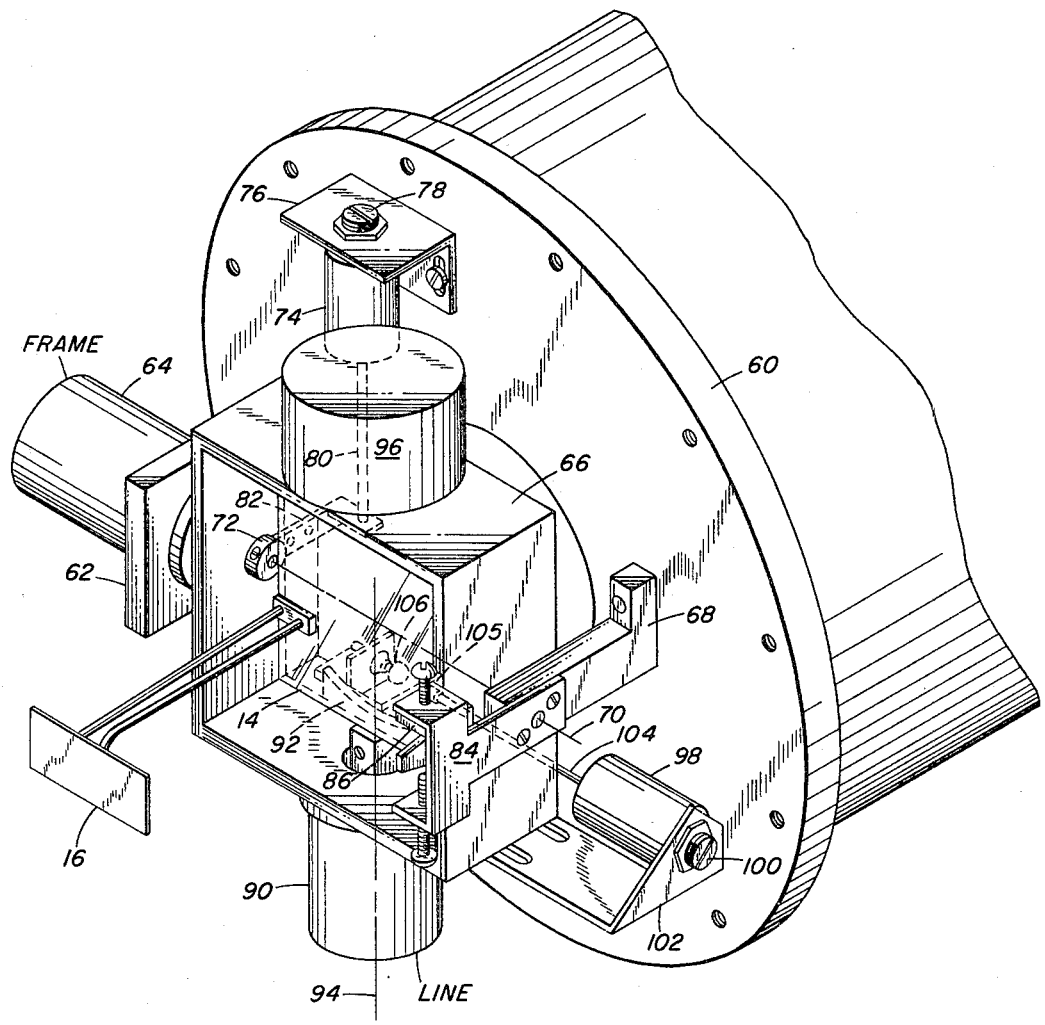
FIG. 4 is an isometric view of the scanning mechanism of the thermograph.

Reference is now made to FIG. 4, which is illustrative of the preferred form of drive. First considering the frame torquer, a frame torquer 64 is mounted by a support 62 to a main support member 60. A frame pivot support 68 is mounted to the main support member 60, to which a gimbal 66 is pivotably mounted thereon for rotation about the frame axis 70. Gimbal 66 is driven by the torquer 64 which is attached thereto by a hub 72. A frame air dashpot 74 is mounted to the main support 60 by a bracket 76. An air dashpot control 78 is provided in the dashpot 74 to provide an adjustment for the resisting force provided by the dashpot. A plunger arm 80 of the dashpot applies a resisting force to an arm 82 which is attached to the gimbal 66 and the hub 72 of the torquer motor 64. A frame physical arm stop 84 is attached to the frame pivot support 68, and includes an upper limit switch 86. In operation of the frame scanning function, the mirror 14 is held against the lower stop of the frame stop arm 84. The frame torquer 64 is driven from a supply voltage of the scan drive generator 36 through a reversing switch (not shown). The reversing switch is thrown to start the cycle, and the mirror scans slowly to the other stop. It then actuates the upper limit switch 86 which returns the entire gimbal to its original position against the lower stop. The frame scan rotates about 10° in about 30 seconds, about the frame axis 70.

For providing the line scanning function, a line torquer 90 is mounted directly on the gimbal 66. The line torquer 90 has the scanning mirror 14 coupled to its drive by a mirror mount 92, so that on excitation the line torquer rotates the mirror 14. This rotation takes place through the line axis 94. A counterweight 96 is positioned on the upper side of the gimbal 66 to provide balance. A line air dashpot 98 with an air dashpot drag control 100 is mounted to the main support member 60 by a bracket 102. A plunger 104 of the dashpot 98 works against a lever arm 105 mounted to the mirror support 92. A line physical stop 106 is mounted on the gimbal 66.

In operation the line scanning function is provided by applying the essentially rectangular waveshaped voltage shown on FIG. 3 from the scan drive generator 36 to the line torquer 90. As will be seen from the wave shape on FIG. 3, the bias adjustment 56 permits the long period of the wave form to put a positive voltage on the line torquer motor 90 and a short period of negative voltage as shown in the shaded portions of the wave shape 54. Since with constant damping applied by the air dashpot 98, displacement is the time integral of torque, these shaded areas of waveform 54 are proportional to displacement in each direction and are made equal by the bias adjustment. Since it is impossible to make them exactly equal, and the effect of inequality is cumulative, the reverse area is adjusted to be slightly larger than the forward one. This voltage applied to the torquer 90 pivots the mirror 14 about the line scanning axis 94. The physical stop 106 is provided to insure that each scan starts from the same point. After each line is scanned and returned to its initial position, the vane 16, which is mounted directly on the scanning mirror 14 by a vane arm 15, provides an ambient temperature reference for the detector 12 as described above. Since the frame torquer is slowly moving the entire gimbal 66 in the elevational direction, new lines in the field of view are continually scanned until a full raster of the field of view is framed.

The thermograph described possesses a number of advantages over other types. The optical layout is simple and provides a small light-weight scanning mirror which can be moved quickly by a simplified, less expensive scanning system. The optical system also exhibits good off-axis performance utilizing the simple lens structure. The constant torque drive against a pneumatic dashpot results in a highly linear drive free from irregularities such as gear tooth chatter. By utilizing a line ambient temperature reference, the electronics are greatly simplified and less expensive. The optical head may be mounted in a unit 12″ long and 8″ in diameter, and lends itself to sealing against ambient conditions and can readily be used with a remote readout display. The sealing may also be used to control the temperature of the scanning radiometer. Also, as has already been pointed out, a a direct photographic recording attachment could be provided which fits directly on the rear of the optical head. In short, a versatile scanning radiometer is provided which is no larger than some simple non-scanning infrared radiometers.

What is claimed is:
1. An infrared thermograph comprising in combination
 (a) an infrared detector,
 (b) an optical means including a scanning mirror for applying infrared radiation from a field of view to said infrared detector,
 (c) scanning means for moving said scanning mirror to form a raster-type scan pattern of successive lines, of the field of view whereby radiation from successive points in the field of view is applied to said infrared detector, (d) scanning drive means coupled to said scanning means, (e) amplifier means coupled to said infrared detector, (f) an adjustable reference voltage source, and (g) means operating in synchronism with said scanning drive means and said scanning mirror for clamping said amplifier means to said adjustable reference voltage source on each of the successive lines scanned in the scan pattern.

2. The infrared thermograph set forth in claim 1 wherein said optical means comprises a lens, said infrared detector being positioned behind said lens and said scanning mirror located about half the focal length from said lens so that the radiation from the field of view of the lens is focused on said detector after being reflected from said scanning mirror.

3. The infrared thermograph set forth in claim 1 wherein said last named means includes a blackened vane which moves in synchronism with said scanning mirror to block said detector from radiation applied thereto by said mirror after each of the succcessive lines scanned.

4. The infrared thermograph set forth in claim 1 wherein said scanning means includes a gimbal having said scanning mirror mounted for pivotal movement therein along a first axis of the gimbal and means driving said scanning mirror to oscillate it to and fro about said first axis in said gimbal, and means for rotating said gimbal about a second axis which is orthogonal to said first axis.

5. The infrared thermograph set forth in claim 4 wherein said scanning mirror and said gimbal are driven by constant torque motors against pneumatic dashpots to provide a linear drive.

6. The infrared thermograph set forth in claim 3 wherein said blackened vane is mounted on said scanning mirror.

7. The infrared thermograph set forth in claim 3 wherein said optical means comprises a lens, said infrared detector being positioned behind said lens and said scanning mirror located about half the focal length from said lens so that radiation from the field of view of the lens is focused on said detector after being reflected from said scanning mirror.

8. The infrared thermograph set forth in claim 3 wherein said scanning means includes a gimbal having said scanning mirror mounted for pivotal movement therein along a first axis of the gimbal, and means driving said scanning mirror to oscillate to and fro about said first axis in said gimbal, and means for rotating said gimbal about a second axis which is orthogonal to said first axis.

9. The infrared thermograph set forth in claim 8 wherein said scanning mirror and said gimbal are driven by constant torque motors against pneumatic dashpots to provide a linear drive.

10. The infrared thermograph set forth in claim 8 wherein said optical means comprises a lens, said infrared detector being positioned behind said lens and said scanning mirror located about half the focal length from said lens so that the radiation from the field of view of said lens is focused on said detector after being reflected from said scanning mirror.

11. The infrared thermograph set forth in claim 1 wherein said last named means includes (a) a clamp threshold circuit coupled to said scanning drive means, (b) said switch which is actuated by said clamp threshold circuit coupled to said amplifier means and a source of reference voltage such that said source of reference voltage is applied to said amplifier means when said switch is actuated, and (c) a blackened vane which moves in synchronism with said scanning drive means to block said detector from radiation from said optical means when said switch is actuated.

References Cited

UNITED STATES PATENTS 3,153,723  10/1964  Weiss _____ 250—83.3
3,287,559  11/1966  Barnes _____ 250—65

ARCHIE R. BORCHELT, Primary Examiner

DAVIS L. WILLIS, Assistant Examiner

U.S. Cl. X.R.

250—65